United States Patent [19]

Gogue

[11] Patent Number: 4,575,652
[45] Date of Patent: Mar. 11, 1986

[54] PERMANENT MAGNET MOTOR HAVING HIGH STARTING TORQUE AND NARROWLY-DEFINED DETENT ZONES

[75] Inventor: George P. Gogue, Beaverton, Oreg.

[73] Assignee: Synektron Corporation, Portland, Oreg.

[21] Appl. No.: 654,728

[22] Filed: Sep. 27, 1984

[51] Int. Cl.[4] .............................................. H02K 37/00
[52] U.S. Cl. .................................. 310/49 R; 310/67 R; 310/156; 310/186; 310/190
[58] Field of Search ................... 310/67, 49, 152–165, 310/186, 190–193

[56] References Cited

U.S. PATENT DOCUMENTS

| | | | |
|---|---|---|---|
| 2,677,090 | 4/1954 | Fleming-Williams et al. | 340/49 |
| 2,761,082 | 8/1956 | Chang | 310/187 |
| 3,264,538 | 8/1966 | Brailsford | 318/138 |
| 3,806,744 | 4/1974 | Abraham et al. | 310/49 |
| 3,873,897 | 3/1970 | Müller | 318/138 |
| 4,286,184 | 8/1981 | Kögler et al. | 310/67 |
| 4,303,843 | 12/1981 | Arnoux et al. | 310/156 X |

Primary Examiner—Donovan F. Duggan
Attorney, Agent, or Firm—Chernoff, Vilhauer, McClung, Birdwell & Stenzel

[57] ABSTRACT

A permanent magnet motor having a highly nonuniform reluctance gap between rotor and stator creating reluctance torque which aligns the rotor in narrowly-defined detent zones when the motor coils are de-energized. To overcome the high reluctance torque present at the detent zones upon energizing of the coils, small auxiliary coils are provided adjacent the high reluctance regions of the gap to give the rotor a high immediate starting torque to escape the detent zones and rapidly achieve steady-state angular velocity.

11 Claims, 4 Drawing Figures

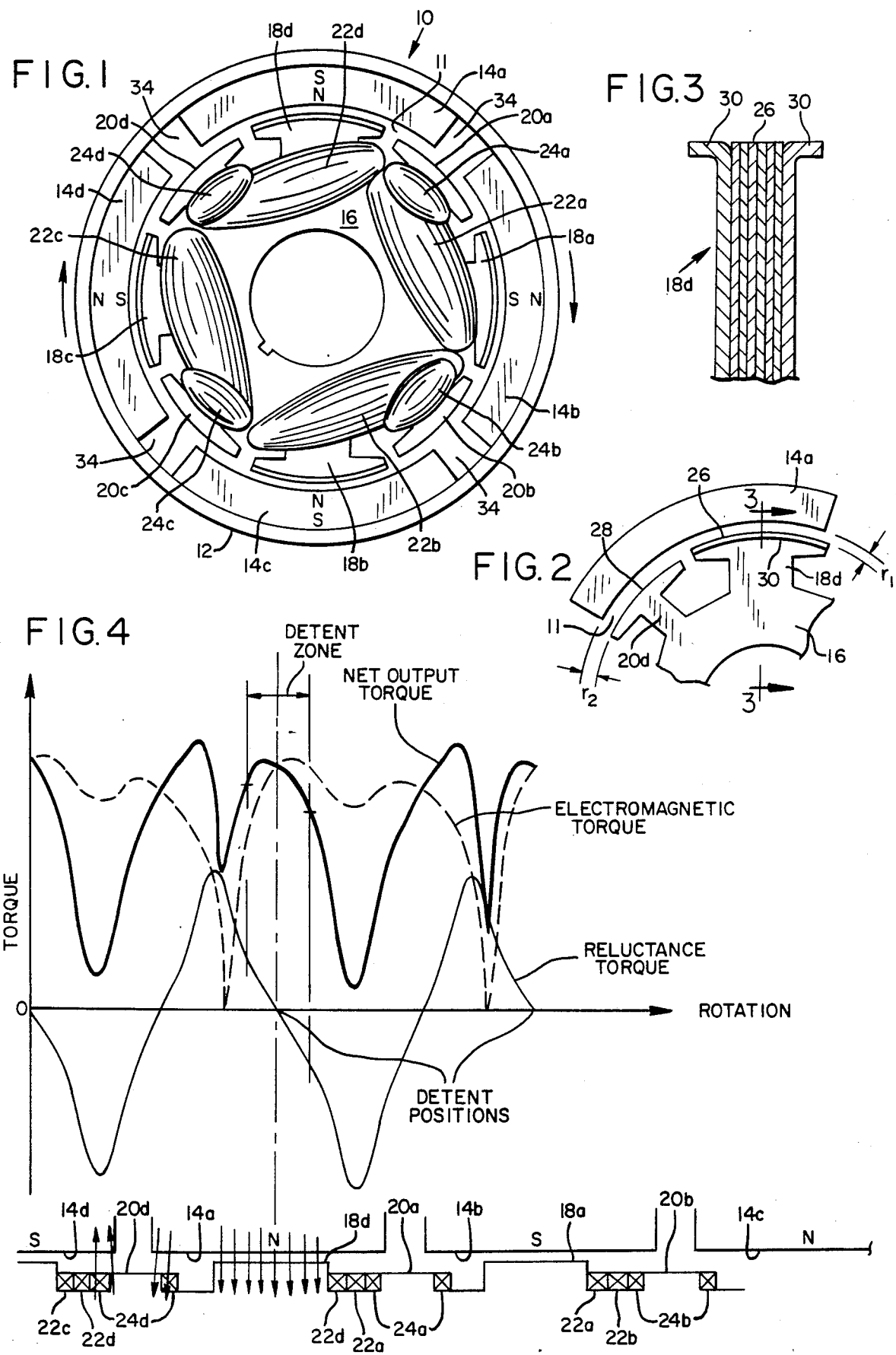

PERMANENT MAGNET MOTOR HAVING HIGH STARTING TORQUE AND NARROWLY-DEFINED DETENT ZONES

BACKGROUND OF THE INVENTION

This invention relates to permanent magnet electric motors, and in particular to a self-starting permanent magnet motor capable of stopping quickly upon de-energization in any one of several predetermined angular orientations, and having a high starting torque so as to quickly achieve steady-state angular velocity upon energization of the motor.

Certain applications calling for the use of permanent magnet electric motors require that the motors be extremely responsive in terms of stopping quickly and accurately upon de-energization of the motor, and rapidly achieving a steady-state rotational velocity upon re-energization of the motor. For example, permanent magnet motors which operate magnetic disk drives in computer-related applications must stop quickly and accurately without substantial oscillation, and start with high acceleration. In addition, space is at a considerable premium in such motors, especially along the axis of rotation of the rotor element. Thus, such motors need to be thin in their axial dimension so as to fit compactly within the confines of the disk drive housing.

The aforementioned desirable characteristics, however, are not readily compatible with one another. The ability to stop the motor quickly and accurately requires, in general, high reluctance torque, while the ability to start the motor quickly requires an even higher electromagnetic torque to overcome the high reluctance torque. High electromagnetic torque may be obtained by maximizing the number and/or size of turns of wire in the energizing coils, but this exacts a penalty in the form of increased resistance or increased volume of the coils and thus of the motor as a whole, and especially tends to enlarge the axial dimension of the motor.

Stopping of the rotor element of a permanent magnet motor in a predetermined position or in one of a set of positions upon de-energization of the motor has usually been accomplished in the past by providing an annular gap of nonuniform reluctance between the rotor and stator. In a rotary permanent magnet motor, such nonuniform reluctance in the gap creates reluctance or cogging torque which varies cyclically with rotation, sometimes adding to and sometimes subtracting from net output torque. Such reluctance torque exists even though the motor windings are de-energized. The reluctance torque results from the fact that the permanent magnets, located on either the rotor or stator element, tend to attract the magnetically permeable core of the other element into a mutual rotational relationship where the nonuniform reluctance of the gap is minimized so as to create the greatest permanent magnet flux between the rotor and stator. The rotational relationships in which the stator and rotor tend to align as a result of reluctance torque to maximize the permanent magnet flux are called detent zones. (A similar torque, also producing detent zones in rotational relationships where permanent magnet flux is maximized, can be created by non-uniform magnetic strengths of the permanent magnets, as illustrated in Brown U.S. Pat. No. 4,438,362.)

Nonuniform gap reluctance has usually been created in the past by providing a winding core of magnetic material having teeth of different sizes defining nonuniform gap dimensions, that is, by having some teeth protrude from the core to a greater degree than others, or by having some teeth wider than others. The longer and/or wider teeth create gap regions of lower reluctance relative to the shorter and/or narrower teeth. The reluctance torque tends to align the rotor and stator in any one of a set of detent zones where the longer and/or wider low-reluctance teeth are aligned with the centers of the permanent magnet poles. Examples of such arrangements include Brailsford U.S. Pat. No. 3,264,538 and Muller U.S. Pat. No. 3,873,897 where a variable reluctance gap is provided by varying the radial protrusion of the teeth of a stator core such that the length of the gap, and therefore its reluctance, varies over the width of each tooth. The detent zones created by such a variable reluctance gap serve to stop the rotor element in predetermined positions upon de-energization of the coil. The positions of the detent zones are selected so that the rotor will be self-starting upon the re-energization of the coil. In other words, the detent zones are arranged so that upon the reapplication of energy to the coil, the rotor will receive electromagnetic starting torque which will accelerate it in the proper direction.

The foregoing designs, however, do not address the problem of maximizing the starting torque in order to move the rotor quickly out of a detent zone. As gap reluctance is made more nonuniform, the detent zones become more narrowly defined and the motor becomes less susceptible to oscillation on stopping due to increased reluctance torque, all of which is desirable. However, the higher the reluctance torque the higher will be the electromagnetic torque required to accelerate the rotor upon energization of the motor because, as the rotor begins to move out of a detent zone, reluctance torque opposing motion increases more rapidly. The requirement for higher electromagnetic torque could be satisfied by simply providing additional turns of wire for the energizing coil, but additional turns would require more volume and increase the axial dimension of the motor which, in some applications as described above, is unacceptable. Alternatively, additional turns of smaller wire could be provided without necessitating an increase in volume and axial dimension if the resistance of the winding is allowed to increase substantially. However, this would result in a corresponding increase in the power requirement and operating temperature of the motor, and a drop in efficiency, which are also undesirable.

Although nonuniform reluctance gaps have been used in combination with nonuniform coil winding structures, as exemplified by Chang U.S. Pat. No. 2,761,082, the nonuniform structures are designed for other purposes and do not cooperate with permanent magnets to maximize starting torque and provide oscillationfree, narrowly-defined detent zones for stopping.

What is needed, therefore, is a permanent magnet motor having narrowly-defined detent zones and a high starting torque, yet occupying relatively little volume, having a relatively small axial dimension and a relatively low winding resistance.

SUMMARY OF THE INVENTION

The present invention satisfies these seemingly incompatible needs by providing a permanent magnet motor having high reluctance torque and narrowly-defined detent zones to stop the rotation of the motor quickly and without oscillation upon de-energization of the coils, and having means for providing high starting torque upon re-energization of the coils to move the rotor quickly out of the detent zone to achieve a steady-state rotational velocity, all without any significant increase in coil volume, axial dimension, or winding resistance.

According to the preferred embodiment of the invention, the motor is of the brushless, single-phase, four-pole type consisting of an inner stator core having a nonuniform, toothed outer surface with electrically-conductive windings thereon for interacting with a surrounding rotor element comprised of radially magnetized permanent magnet members having inner poles spaced about the inner periphery of a rotor housing. However, the particular form of the motor, that is, whether singlephase or multiphase, or having four or some other number of poles, or having radial or other magnetization, or having the core on the stator or rotor, or having the rotor external or internal, or having teeth or no teeth, or creating detent zones by variable reluctance or variable magnetization, is not critical to the invention since the invention may be employed in a variety of types of permanent magnet motors.

In the preferred embodiment, the motor includes a gap of highly nonuniform reluctance formed by nonuniform teeth on the core, about which the coil windings are disposed. The teeth are of differing widths and lengths, the wider teeth also being longer, that is, protruding farther toward the permanent magnet inner poles, thereby lowering the gap reluctance in the region of these larger teeth. The larger teeth also preferably include flux collectors, which are small outwardly flanged members on the sides of the large teeth, to differentiate the gap reluctances in the respective regions of the large and small teeth even further. This tooth structure creates a highly nonuniform gap reluctance.

The surrounding rotor includes a permanent magnet member or members having inner poles of alternating polarity of a number and spacing corresponding to the large teeth. (The term "poles" is used broadly herein also to include pole pieces attached to permanent magnets, if such pole pieces are used.) The permanent magnets, in cooperation with the highly nonuniform gap reluctance, create a high reluctance torque which tends to align the center of each of the large teeth with the center of each permanent magnet inner pole, respectively, thereby forming narrowly-defined detent zones.

In order to provide high starting torque, each of the smaller teeth is positioned so as to span a pair of permanent magnet inner poles of opposite polarity whenever the large teeth are centered on the poles in the detent position. Both primary and auxiliary coils are provided. The primary coils have turns of considerable length wound about both a large and small tooth, while the auxiliary coils have much shorter turns wound solely about each of the small teeth. With the large teeth centered upon each of the permanent magnet inner poles in the detent position, the small auxiliary coils on the small teeth are able to span a pair of opposite magnet poles and thus provide added starting torque despite the short length of their turns. Upon energization they provide a high starting torque in cooperation with the primary coils, which overcomes the reluctance torque and moves the rotor quickly out of the detent zone and toward its steady-state rotational speed.

The use of an auxiliary coil on each of the smaller, high-reluctance teeth to provide added starting torque is particularly advantageous because the auxiliary coils need occupy relatively little volume to perform their specific task due to their location between poles of opposite polarity while the rotor is in a detent zone. Thus neither the small axial dimension of the motor nor the narrow, well-defined detent zones need be sacrificed to obtain a high level of net starting torque.

Accordingly, it is a primary objective of the present invention to make the combined features of narrowly-defined detent zones, high starting torque, small axial dimension and low winding resistance compatible in a permanent magnet motor.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a simplified end view of the rotor and stator elements of an exemplary rotary permanent magnet motor constructed according to the present invention.

FIG. 2 is a partial view of the elements of FIG. 1 showing two of the stator teeth without any windings disposed thereon.

FIG. 3 is a sectional view of one of the larger stator teeth taken along line 3—3 of FIG. 2.

FIG. 4 is a graphic representation illustrating reluctance torque, electromagnetic torque and net output torque at relative rotational positions of the stator and rotor of FIG. 1, the relative positions being depicted schematically in linearized form for simplicity.

DETAILED DESCRIPTION OF THE INVENTION

With reference to FIG. 1, the exemplary motor 10 includes an outer rotor 12 having a plurality of permanent magnet members 14a, b, c and d, respectively, and an inner, magnetically permeable, laminated, toothed stator core 16 separated from the magnets by an air gap 11. The stator core includes four evenly-spaced large teeth 18a, b, c and d, respectively, and four evenly-spaced smaller teeth 20a, b, c and d, respectively, positioned between the large teeth. Primary coil windings 22a, b, c and d are each wound about both a large and a small tooth, such as teeth 18a and 20a. Auxiliary coils 24a, b, c and d having turns much shorter than, and a volume much less than, that of the primary coils, are each wound solely about a respective smaller tooth such as 20a.

Referring now to FIG. 2, each large tooth such as 18d includes an outer surface 26 which is wider than the outer surface such as 28 associated with each of the smaller teeth. In addition, the large teeth protrude farther toward the permanent magnets than do the smaller teeth, as indicated by the different gap lengths labeled r1 and r2, respectively. Due to these differences between the physical size of the large and small teeth, the air gap 11 has a highly nonuniform reluctance. The large outer surface and small gap length associated with each large tooth such as 18d provide the air gap regions adjacent the large teeth with a low magnetic reluctance compared with the gap regions adjacent the small teeth. Thus, the gap 11 between the stator 16 and the inner poles of magnets 14a, b, c and d has a reluctance which ranges from regions of low reluctance associated with the large teeth 18a, b, c and d to regions of high reluctance associated with the smaller teeth 20a, b, c and d.

The gap reluctance may be made still more nonuniform by adding flux collectors 30 to the large teeth. This is best shown in FIG. 3 where flux collectors 30 are L-shaped laminations enlarging further the area of the outer tooth surface 26. Still further non-uniformity of the gap reluctance can be provided by making the magnets' radial thickness nonuniform so that they taper circumferentially to a smaller radial thickness in both directions from their centers, forming curved inner pole surfaces which are nonconcentric relative to the motor axis.

The exemplary motor 10 of FIG. 1 is a single-phase motor with normal brushless commutation. Each primary coil and auxiliary coil associated with a pair of large and small teeth are wound in the same direction and may be either electrically separate or electrically connected. The winding direction of each coil pair alternates, i.e. one being clockwise and the next being counterclockwise.

The permanent magnet members 14 are of alternating polarity and radially magnetized as shown by the letter designations N and S marked on each of the poles. The inner poles are separated by spacings 34, and each of the smaller teeth and auxiliary coils is sufficiently large to span the spacings 34 between pairs of adjacent inner poles.

Each primary coil 22a, b, c and d is wound about both a large tooth and small tooth, whereas the auxiliary coils 24a, b, c and d are wound solely about the smaller teeth. Thus, the auxiliary windings serve to increase the number of turns and/or winding volume only with respect to the smaller teeth for each respective tooth pair. In the exemplary embodiment, for instance, the primary coil may include 40 turns of bifilar winding and the auxiliary coil may include 20 turns of bifilar winding. Thus each high reluctance smaller tooth 20a, b, c and d includes 50% more coil turns than each low reluctance larger tooth 18a, b, c and d.

The net effect of the construction of the motor described above is shown in FIG. 4. The stator-rotor rotational relationship is represented schematically in linearized form at the bottom of FIG. 4, and the graphs at the top of FIG. 4 show the cyclical curves of reluctance torque, electromagnetic torque (or back EMF which is proportional to electromagnetic torque), and net output torque, respectively. The arrows spanning the air gap between the rotor and stator at the bottom of FIG. 4 represent magnetic lines of flux operatively interacting with the windings. In both FIGS. 1 and 4, the rotor is shown in a detent position relative to the stator. There are four such detent positions separated b 90 mechanical degrees.

The shape of the electromagnetic torque (or back EMF) curve results from the energization of the auxiliary coils in combination with the primary coils. The reluctance torque curve results solely from the permanent magnets without regard to any coil energization. The net output torque at any time is the sum of the two curves.

The reluctance torque curve represents the torque exerted on the rotor by the permanent magnets when the coils are de-energized. Since the large teeth define gap regions of much lower reluctance than the smaller teeth, the reluctance torque will tend to center each of the large teeth opposite the center of each of the permanent magnet poles in a detent position as shown in FIGS. 1 and 4. The greater the difference in reluctance between the gap regions adjacent the large and small teeth, respectively, the steeper will be the reluctance torque curve and the higher will be the peaks of the curve, creating narrowly-defined detent zones substantially free of oscillation on stopping of the motor. This also means, however, that the reluctance torque resisting movement of the rotor out of the detent zones upon starting of the motor is high, steeply building to a maximum in either direction.

As FIG. 4 shows, when the rotor and stator are positioned in a detent zone, energization of the coils will provide a high initial level of electromagnetic torque. This is due in large part to the presence of the auxiliary coils such as 24d which, despite the short length of their windings, are advantageously positioned to transmit torque in the detent position because their turns operatively span the opposite fields of adjacent magnets such as 14d and 14a. Consequently, the auxiliary coils provide a high amount of starting torque which falls off sharply as the rotor moves away from the detent zone because the auxiliary coils quickly leave the torque-producing influence of the opposite magnetic fields. Although reluctance torque builds quickly in the opposite direction when moving away from the detent zone, the momentum provided by the starting torque keeps the rotor from decelerating until the torque-producing influence of the primary coil begins building toward the second peak of the electromagnetic torque curve. Without the auxiliary coils, the first peak of the electromagnetic torque curve (in the detent zone) would not have nearly as much amplitude as that shown in FIG. 4.

The added starting torque is obtained without any substantial attendant increase in coil volume or resistance because the auxiliary coil turns can be extremely short and still accomplish their highly localized torque-producing function by spanning the space between adjacent opposite permanent magnet poles when the rotor is in the detent zone.

The invention also contemplates the provision of a gap of nonuniform reluctance by means other than a stator employing plurality of teeth of differing dimensions. For example, a toothless, smooth stator core may be employed having lobes so as to create a noncircular curvature similarly defining a gap of varying reluctance, or the magnet poles can have a surface configuration which is nonconcentric relative to the motor axis to provide varying gap reluctance. In such cases an unevenly distributed winding in the gap could similarly provide a higher number of turns of the coil in regions of high reluctance than in regions of low reluctance. Alternatively, other means such as nonuniform magnetization of the permanent magnets could be used to create detent zones instead of nonuniform reluctance, as mentioned earlier.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A permanent magnet motor having a stator element and a rotor element defining a gap therebetween, one of said elements having a core and the other of said elements having at least a pair of permanent magnet poles of opposite polarity facing said core and gap, and electrically-conductive coil means mounted on said core for selectively energizing or de-energizing said motor, said core and poles comprising detent means for causing varying amounts of magnetic flux across said gap when said motor is de-energized depending upon the rotational relationships of said core and poles to each other so as to create detent positions of said core and poles in those rotational relationships thereof wherein said flux is maximized, said coil means comprising a primary coil means and an auxiliary coil means each having turns of electrically-conductive wire, the turns of said auxiliary coil means being of lesser length than the turns of said primary coil means, the turns of said auxiliary coil means being positioned on said core so as to operatively span both of said pair of permanent magnet poles of opposite polarity when said core and poles are in one of said detent positions.

2. The motor of claim 1 wherein said detent means comprises means on said core for forming a plurality of first and second gap regions of different magnetic reluctance, each second gap region having a higher reluctance than each first gap region, the turns of said auxiliary coil means being mounted on said core in positions corresponding operatively to said second gap regions.

3. The motor of claim 2 wherein said core has a plurality of teeth formed thereon of different sizes, each tooth defining either a first or second gap region depending upon its size.

4. The motor of claim 3 wherein said primary coil means is operatively associated with teeth defining both said first and second gap regions, and said auxiliary coil means is operatively associated with teeth defining only said second gap regions.

5. The motor of claim 3 wherein those teeth defining said first gap regions have flux-collecting members mounted thereon, and those teeth defining said second gap regions do not have said flux-collecting members mounted thereon.

6. A permanent magnet motor having a stator element and a rotor element defining a gap therebetween, one of said elements comprising a plurality of permanent magnet poles of opposite polarity, having spacings therebetween, facing said core and gap, and the other of said elements comprising a core having electrically-conductive coil means mounted thereon for selectively energizing or de-energizing said motor, said core and poles comprising detent means for causing said stator element and rotor element to assum any one of a plurality of predetermined relative rotational detent positions with respect to each other when said motor is deenergized, said coil means having a plurality of primary coils and auxiliary coils each having turns of electrically-conductive wire, the turns of said auxiliary coils being of lesser length than the turns of said primary coils, said auxiliary coils being mounted on said core in positions corresponding to said spacings between said permanent magnet poles of opposite polarity when said stator and rotor elements are in any one of said detent positions.

7. The motor of claim 6 wherein said auxiliary coils have turns at least long enough to span one of said spacings between said permanent magnet poles of opposite polarity.

8. The motor of claim 6 wherein said detent means comprises means on said core for forming a plurality of first and second gap regions of different magnetic reluctance, each second gap region having a higher reluctance than each first gap region, the turns of said auxiliary coils being mounted on said core in positions corresponding operatively to said second gap regions.

9. The motor of claim 8 wherein said core has a plurality of teeth formed thereon of different sizes, each tooth defining either a first or second gap region depending upon its size, those teeth defining said second gap regions being large enough to span one of said spacings between said permanent magnet poles of opposite polarity.

10. The motor of claim 9 wherein said primary coils are operatively associated with teeth defining both said first and second gap regions, and said auxiliary coils are operatively associated with teeth defining only said second gap regions.

11. The motor of claim 9 wherein those teeth defining said first gap regions have flux-collecting members mounted thereon, and those teeth defining said second gap regions do not have said flux-collecting members mounted thereon.

* * * * *

UNITED STATES PATENT AND TRADEMARK OFFICE
CERTIFICATE OF CORRECTION

PATENT NO. : 4,575,652

DATED : March 11, 1986

INVENTOR(S) : George P. Gogue

It is certified that error appears in the above-identified patent and that said Letters Patent is hereby corrected as shown below:

Col. 2, line 56   Change "oscillationfree" to --oscillation-free--.

Col. 5, line 51   Change "b" to --by--.

Col. 6, line 40   After "employing" add the word --a--.

Col. 8, line 4    Change "assum" to --assume--.

Signed and Sealed this

Eighteenth Day of November, 1986

Attest:

DONALD J. QUIGG

*Attesting Officer*     *Commissioner of Patents and Trademarks*